US006584676B1

United States Patent
Chang et al.

(10) Patent No.: US 6,584,676 B1
(45) Date of Patent: Jul. 1, 2003

(54) METHOD FOR MANUFACTURING A POLE TIP TRIMMED READ/WRITE HEAD STRUCTURE

(75) Inventors: Yu-En Percy Chang, Mountain View, CA (US); Thomas Young Chang, San Jose, CA (US); Michael A. Parker, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,659

(22) Filed: May 2, 2000

Related U.S. Application Data (62) Division of application No. 09/122,267, filed on Jul. 24, 1998, now abandoned.

(51) Int. Cl.[7] .......................... G11B 5/127; H04R 31/00
(52) U.S. Cl. ................. 29/603.12; 29/603.07; 29/603.13; 29/603.15; 216/22; 360/126
(58) Field of Search .................. 29/603.12, 603.13, 29/603.15, 603.18, 603.07; 360/113, 121, 317, 126; 216/22, 40, 66, 39

(56) References Cited

U.S. PATENT DOCUMENTS

| | | | |
|---|---|---|---|
| 4,821,131 A | 4/1989 | Gotoh | 360/103 |
| 4,998,174 A | 3/1991 | Wada et al. | 360/103 |
| 5,057,956 A | 10/1991 | Muratomi et al. | 360/122 |
| 5,277,750 A * | 1/1994 | Frank | 156/643 |
| 5,305,166 A | 4/1994 | Inoue | 360/103 |
| 5,633,771 A * | 5/1997 | Yoda et al. | 360/121 |
| 5,804,085 A * | 9/1998 | Wu et al. | 29/603.15 |
| 5,878,481 A * | 3/1999 | Feng et al. | 29/603.15 |
| 5,966,277 A * | 10/1999 | Koshikawa et al. | 360/126 |
| 5,996,213 A * | 12/1999 | Shen et al. | 29/603.15 |
| 6,014,296 A * | 1/2000 | Ichihara et al. | 360/135 |
| 6,026,559 A * | 2/2000 | Ishiwata | 29/603.14 |
| 6,141,183 A * | 10/2000 | Wu et al. | 360/126 |
| 6,236,543 B1 * | 5/2001 | Han et al. | 360/236.6 |

OTHER PUBLICATIONS

Data Sheet entitled "Micrion 9500HT . . . Focused Ion Beam System", dated 1997 based upon information and belief.
Data Sheet "Micrion Micromill HT . . . Focused Ion Beam System", dated 1997 based upon information and belief.

\* cited by examiner

Primary Examiner—Peter Vo
Assistant Examiner—Minh Trinh
(74) Attorney, Agent, or Firm—Dan Hubert & Assoc.

(57) ABSTRACT

A method for finishing a pole tip trimmed read/write heat that includes a substrate with a pole tip structure having a shield, a shield/pole, and an outer pole. A gap region separates the pole and the shield/pole. First, pole tip trimming is performed to the read/write head to remove matter from the shield/pole, the pole, and the gap region. This defines a bridge composed of inward-facing extensions of the pole and shield/pole interconnected by an intervening region. This bridge separates recessed "trenches," each formed by removing a contiguous mass from the shield/pole, the gap region, and the pole. Next, an overlayer is applied over the pole tip structure, filling the recessed trenches. The coated structure is then trimmed to remove all coating material overlying the shield/pole and pole. Trimming is continued to additionally remove a top layer of the protrusions of the pole and shield/pole to remove any rounded edges created by pole tip patterning, resulting in a more distinct write head. The refilled trenches of the recessed areas impart improved resistance to corrosive attack, to head-crashes from the release of accumulated debris, and to mechanical damage of the trimmed pole-tip structure.

11 Claims, 6 Drawing Sheets

METHOD FOR MANUFACTURING A POLE TIP TRIMMED READ/WRITE HEAD STRUCTURE

CROSS-REFERENCE TO RELATED APPLICATIONS

This application is a divisional of U.S. patent application Ser. No. 09/122,267, filed on Jul. 24, 1998, now abandoned.

BACKGROUND OF THE INVENTION

1. Field of the Invention

The present invention relates to magnetic read/write heads for exchanging data with magnetic storage media. More particularly, the invention concerns a process for manufacturing a pole tip trimmed read/write head with increased resistance to wear and debris collection, sharp pole tip corners, and reduced tip recession by backfilling slider pockets and lapping slider surfaces to create a level air bearing surface with a more distinct write component. Another aspect of the invention is an apparatus embodying such a read/write head.

2. Description of the Related Art

In this modern information age, there is a tremendous volume of electronic data for people and computers to manage. The management requirements not only involve transmission, receipt and processing of this information, but storage of the data as well. And, with more data to store, computer users are demanding extremely high capacity digital data storage devices. People store digital data using magnetic disk drives, removable diskettes, magnetic tape, CD-ROMs, and many other forms.

One approach to increasing storage capacity is to increase the size of the storage device. Another, more challenging approach is to increase the density of the stored data. In this way, more information can be stored in the same size of storage device. Thus, engineers developing especially small systems such as laptop computers are motivated by two opposing forces: the need to make smaller and lighter storage devices on one hand, but the need to store more data on the other.

In the disk drive field, read/write head structure is a critical factor in the ability to build smaller drives. There are many known varieties of read/write head, many of which have been developed by International Business Machines Corp. ("IBM"), and described in issued patents assigned to IBM. One recent development is the Focused Ion Beam Machining ("FIBM") technique, which is used to manufacture read/write heads with greater write density. Basically, the FIBM technique uses ion milling to reduce the size of certain head subcomponents, thereby increasing the storage density.

Figure 1:
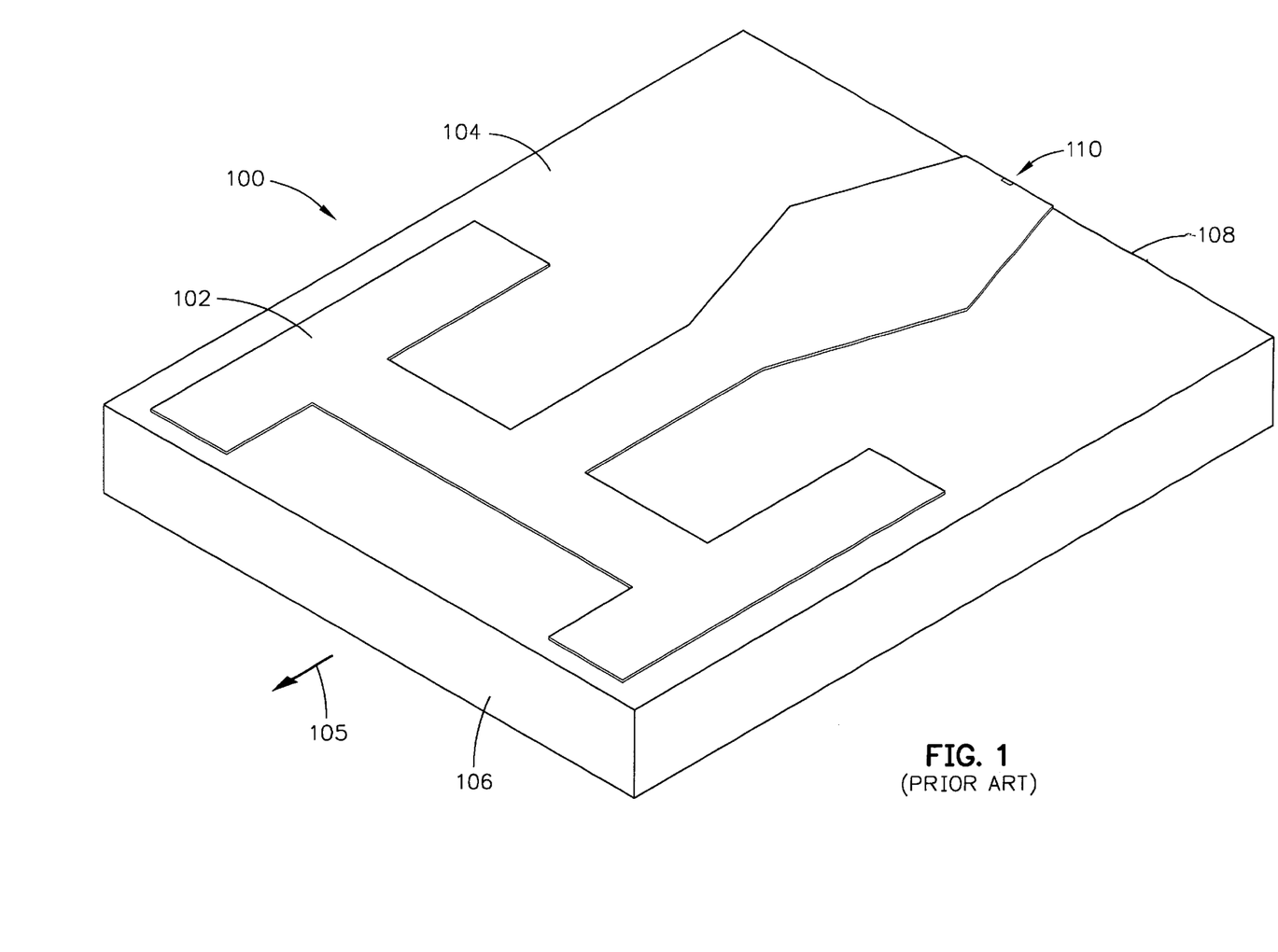
FIG. 1 is a perspective view diagram of a known slider, as seen from the ABS side.

FIG. 1 depicts an exemplary slider 100 to help explain the FIBM technique more specifically. The slider 100 includes an air bearing surface ("ABS") 102 which normally glides over a storage disk (not shown) separated by a thin cushion of air called an "air bearing" (not shown). In the illustrated example, the slider 100 moves in a direction 105 relative to the storage medium. The ABS 102 is raised with respect to a neighboring surface 104 that is recessed due to etching, ion milling, etc. As one example, the slider 100 may be composed of a mixture of aluminum oxide ($Al_2O_3$) and titanium carbide (TiC).

The slider 100 has a leading edge 106 and a trailing edge 108. Near the trailing edge 108 lies a pole tip structure 110, which lies flush with the ABS 102 and contains circuit components that actually perform the read and write operations. These circuit components are deposited onto the trailing edge 108 of the slider 100, which may also be called the "deposit end."

Figure 2:
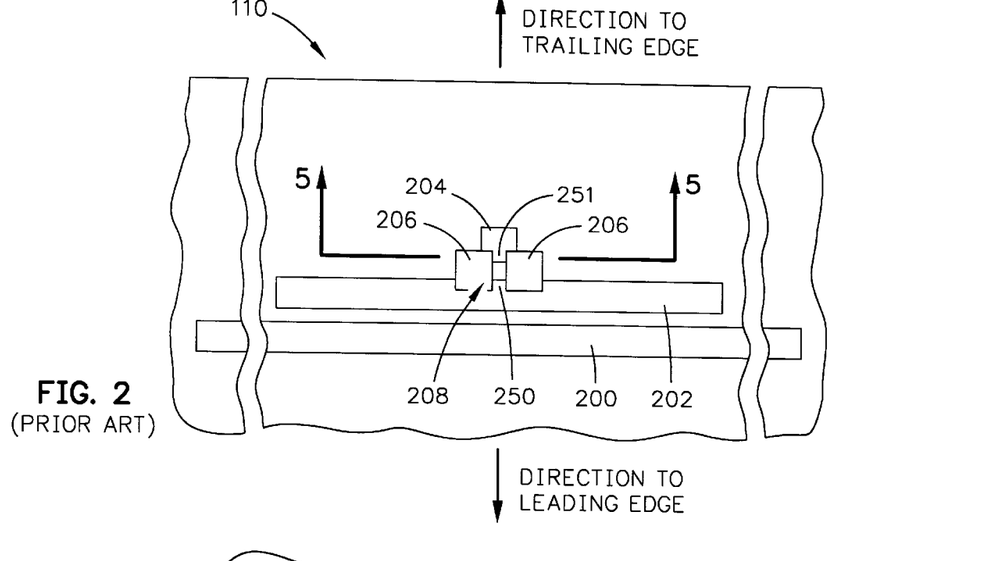
FIG. 2 is an enlarged plan view showing the pole tip area of a known slider, as seen from the ABS side.

FIG. 2 shows the pole tip structure 110 in greater detail. The pole tip structure 110 performs reading and writing operations with various subcomponents, such as poles, shields, read elements, and the like. In this example, the pole tip structure 110 includes a shield 200, a combined shield/pole 202, and a pole 204. Between the shield 200 and shield/pole 202 lies a read element (not shown), such as a magnetoresistive ("MR") stripe in the case of a MR head. Read operations are performed cooperatively by the shield 200, MR stripe, and shield/pole 202. Write operations are performed by the shield/pole 202 and the pole 204 cooperatively.

Figure 3:
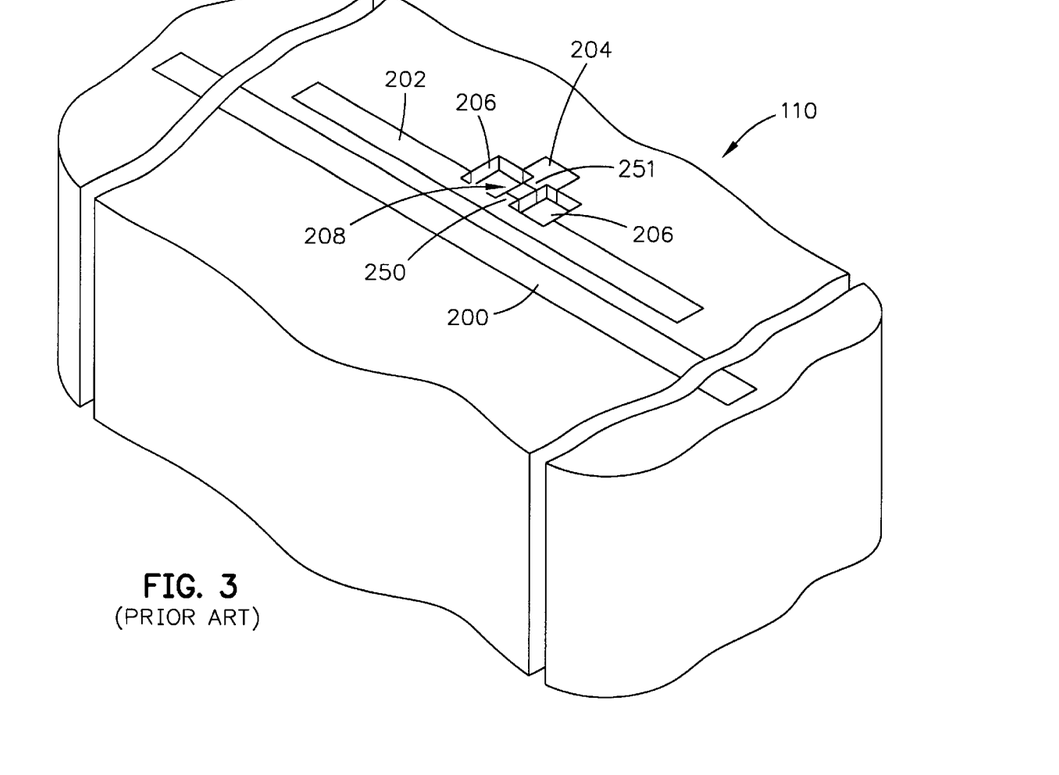
FIG. 3 is a perspective view showing the pole tip area of a known magnetic disk drive read/write head, as seen from the ABS.

The FIBM technique uses a focused ion beam to remove portions of the shield/pole 202, portions of the pole 204, and portions of the material intervening between the shield/pole 202 and pole 204. This technique is also called "pole tip trimming." This creates recessed areas 206. Pole tip trimming effectively narrows the sections of the pole 204 and shield/pole 202 that face each other. The resultant protrusions 250–251 of the shield/pole 202 and the pole 204 enable the slider 100 to write to a smaller area, therefore boosting storage density. The opposing protrusions 250–251 are joined by the connecting region of the ABS 102 form a bridge 208. To further illustrate the pole tip structure 110, FIG. 3 illustrates the structure 110 in perspective view.

Although the FIBM technique constitutes a significant advance and may even enjoy significant commercial and/or scientific recognition, IBM continually seeks to improve the performance and efficiency of disk drive systems, including the read/write head subcomponents.

SUMMARY OF THE INVENTION

Broadly, the present invention concerns a process for manufacturing a pole tip trimmed read/write head with increased resistance to wear and debris collection by backfilling slider pockets and lapping slider surfaces to create a level air bearing surface with a more distinct write component.

Initially, the read/write head includes a substrate with an air bearing surface that includes a pole tip structure. The pole tip structure has a shield, a shield/pole substantially parallel to the shield, and an outer pole substantially parallel to the shield/pole. A gap region separates the pole and the shield/pole. First, pole tip trimming is performed to the read/write head to remove matter from the shield/pole, the pole, and the gap region. This defines a bridge composed of protrusions of the shield/pole and the pole joined by a connecting region of the intervening gap region. The bridge separates recessed areas, each formed by removing a contiguous mass from the shield/pole, the gap region, and the pole.

Next, thin film deposition is performed to apply a coating material over the pole tip structure, filling the recessed areas. The coated surface is then trimmed sufficiently to remove all coating material overlying the shield/pole and pole. Trimming may be performed by lapping or polishing, for example. Trimming is continued to additionally remove a top layer of the protrusions of the pole and shield/pole, and to remove any rounded edges created by pole tip trimming, resulting in a more distinct write head.

Accordingly, in one embodiment the invention may be implemented to provide a method to manufacture a pole tip trimmed read/write head. In another embodiment, the invention may be implemented to provide an apparatus, such as a pole tip trimmed read/write head, or a disk drive system utilizing such a head.

The invention affords its users with a number of distinct advantages. First, the invention reduces the possibility of collecting debris in recessed areas of a pole tip patterned slider. In turn, this helps reduce friction between the slider and disk, avoiding head/disk wear. Avoiding head/disk wear helps prevent data loss resulting from head/disk damage. Additionally, eliminating a collection site for debris imparts additional benefits to the head, such as resistance to corrosive attack of the pole-tips due to entrainment of corrosive debris, and resistance to head crashes caused by accumulated debris dropping onto the disk.

A further advantage of the invention is also provided by the encapsulation of the recessed trenches caused by pole tip trimming techniques such as FIBM. Namely, the encapsulation of the trenches helps avoid any corrosion hazards posed by corrosive materials such as gallium, which may be implanted in the pole tip structure during pole tip trimming. By encapsulating the trimmed trenches, these corrosive materials are sequestered under an overlayer that reduces the likelihood of their release in a reactive form, especially in proximity to the trimmed pole tips themselves.

The invention also helps reduce the recession of the pole and shield/pole regions from the ABS, which helps maintain the strength of both write and read signals. By maintaining the strength of these signals, the invention promotes a high storage density, enabling a smaller overall storage device. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a pole tip trimmed read/write head with increased resistance to wear and debris collection, sharp pole tip corners, and reduced pole tip recession, due to backfilled slider pockets and lapped slider surfaces creating a level air bearing surface. Another aspect of the invention is a disk drive system utilizing such a read/write head. A different aspect of the invention is a process for manufacturing such a pole tip trimmed read/write head.

Analysis of Pole Tip Trimmed Heads

Despite the greater storage density afforded by the pole tip trimmed structure 110, the present inventors have nonetheless analyzed this configuration with an eye toward any possible improvements. In this endeavor, the inventors have considered the otherwise unrecognized possibility that the recessed areas 206 might collect debris, such as any contamination present in the disk drive environment, powder created by occasional contact between disk and slider, etc. As considered by the inventors, such debris might possibly create friction between the slider and disk surface, accelerating head and disk wear. Accelerated head wear may increase the likelihood of a head/disk collision, or in extreme cases generate friction that damages the disk surface and destroys stored data.

Another possible limitation of the structure 110 concerns recession of the bridge region 208 with respect to the ABS 102, this bridge 208 being made up of the inward-facing extensions 250–251 of the shield/pole 202 and the pole 204 and the area in between. As recognized by the present inventors, the normal FIBM process removes a significant amount of material from the extensions 250–251, causing an ultimate recession with respect to the rest of the ABS 102 and pole tip structure 110, which are otherwise generally planar. This recession effectively increases the magnetic clearance between the pole tip structure 110 and the recording medium. Since the strength of stored signals is inversely proportional to flying height, the recessed bridge 208 writes weaker signals to the disk. And, weaker signals cannot be stored with the same density as stronger signals, since these weaker signals are less distinct. Therefore, with less storage density, the size of the storage device employing the slider 100 is increased. This is generally undesirable in most situations, and especially so in extremely compact storage devices such as laptop computer disk drives.

A related problem discovered by the inventors is that due to FIBM, the extensions 250–251 exhibit rounded edges, rather than sharply defined edges. As recognized by the inventors, this may degrade the track-to-track storage resolution, further contributing to poor storage density.

Manufacturing Process

Having made the analysis described above, the present inventors responded by developing an improved read/write head that avoids the foregoing limitations of known pole tip trimmed heads. One aspect of the invention is a method for manufacturing a pole tip trimmed read/write head exhibiting increased resistance to wear and debris collection due to backfilled slider pockets and lapped slider surfaces, creating a level air bearing surface.

Figure 4:
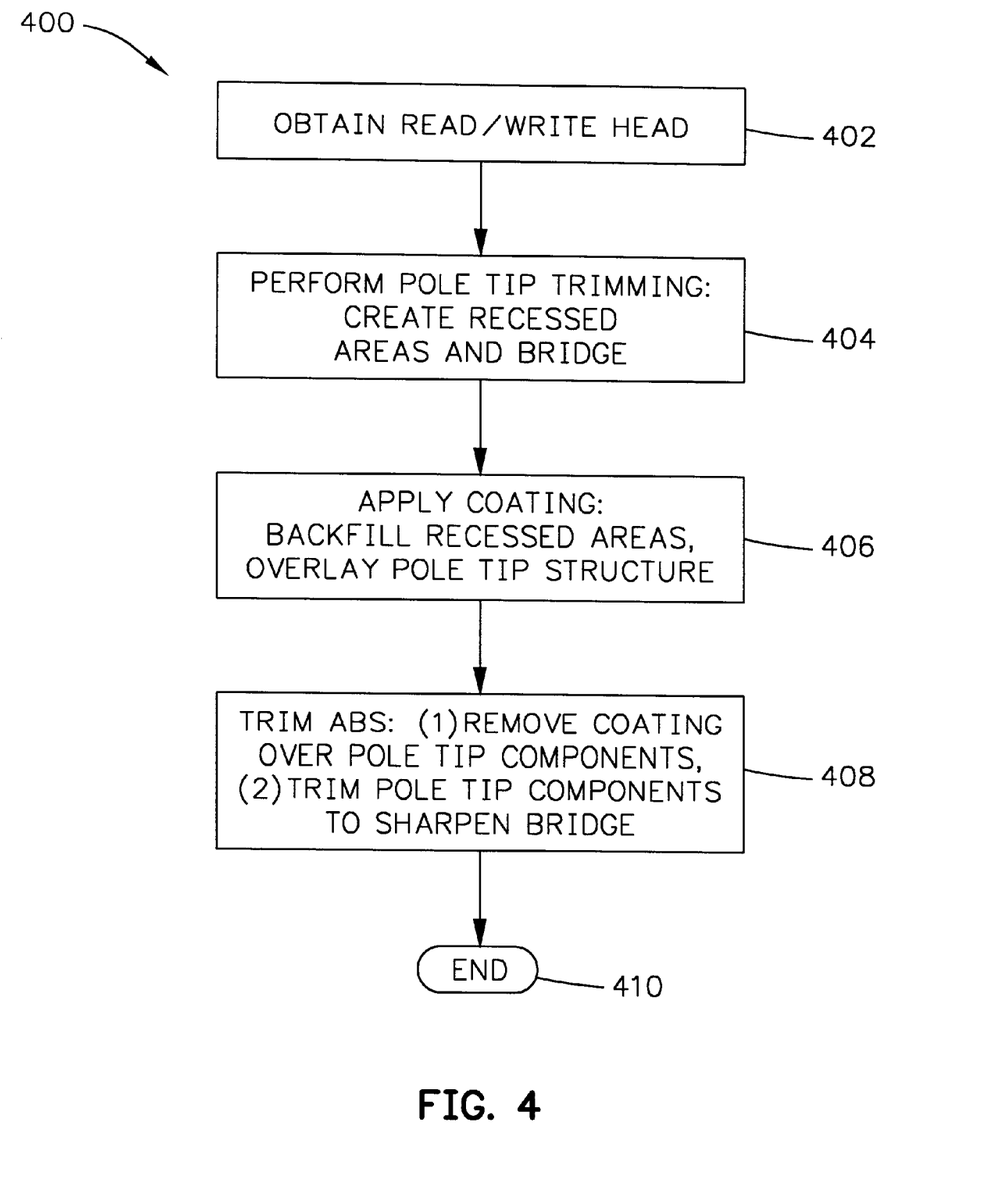
FIG. 4 is a flowchart showing a sequence of operational steps for creating a backfilled etched read/write head in accordance with the present invention.

FIG. 4 shows a process 400 illustrating one example of the method aspect of the present invention. This sequence describes steps for modifying a read/write head to create the backfilled, lapped, and pole tip trimmed head of the invention. The sequence 400 is explained in terms of the slider 100 shown in FIGS. 1–6B. First, step 402 obtains a read/write head with read/write subcomponents such as the pole tip structure 110. The structure 110 includes a shield 200, shield/pole 202, and an "outer" pole 204. As an example, the shield 200 may be manufactured from a material such as SENDUST, which is an alloy of iron, aluminum, and silicon. The shield/pole 202 and pole 204 may use a material such as PERMALLOY, for instance. Although not shown, the pole tip structure 110 may include other features such as a MR stripe. These and a variety of other techniques and materials may be used in constructing the slider 100, as will be apparent to those of ordinary skill in the relevant art.

In accordance with the invention, the components of the slider 100, and especially the pole tip structure 110, may be slightly thicker than usual. This may be achieved, for example, by limiting the amount of lapping performed during finishing of the slider 100. As one example, the shield 200, shield/pole 202, and pole 204 may be about 0.5 microns thicker than normal. This extra thickness anticipates the additional lapping performed to slider 100 later, as described below.

Figure 5A:
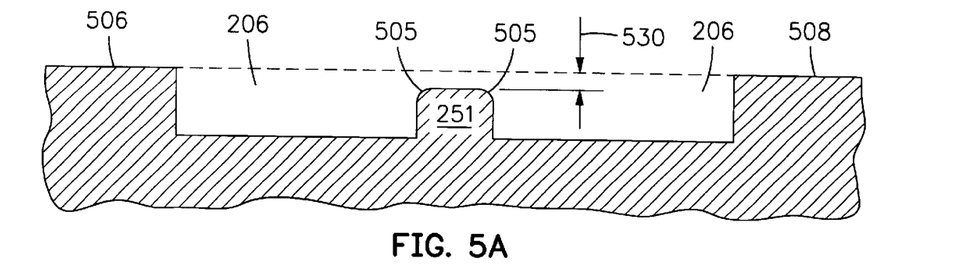
FIGS. 5A–5D show cross-sectional views (taken along the line 5—5 of FIG. 2) of a slider during various stages of backfilling and lapping, in accordance with the invention.

Step 404 performs pole tip trimming upon the pole tip structure 110 to create the 20 recessed areas 206 divided by the bridge 208. The recessed areas 206 may also be referred to as "trenches." As an example, step 404 may use the FIBM technique, ion milling, reactive ion etching (RIE), or another suitable chemical, mechanical, chem-mechanical, or other process. After step 404, the pole tip structure 110 appears as shown by FIG. 5A, which shows a cross-section of the pole tip structure 110 along the line 5—5 of FIG. 2. Specifically, FIG. 5A shows recessed areas 206 separated by the extension 251 of the pole 204. Outside the recessed areas 206 lie the regions 506 and 508 of the gap or other material between the pole 204 and shield/pole 202. The recessed areas 206 may exhibit a depth of about one micron with respect to the outlying regions 506, 508. As a result of the step 404, and particularly the FIBM technique, the extension 251 of the pole 204 exhibits rounded corners 505. Although not shown in FIGS. 5A–5D, these rounded corners are also present on the extension 250 of the shield/pole 202 as well as the to intervening gap region joining the extensions 250–251.

The inventors have also observed a material height difference 530 between the extension 251 and the regions 506 and 508, which are level with the original ABS 102. This additional recession also occurs for the complementary extension 250 of the shield/pole 202.

Figure 5B:
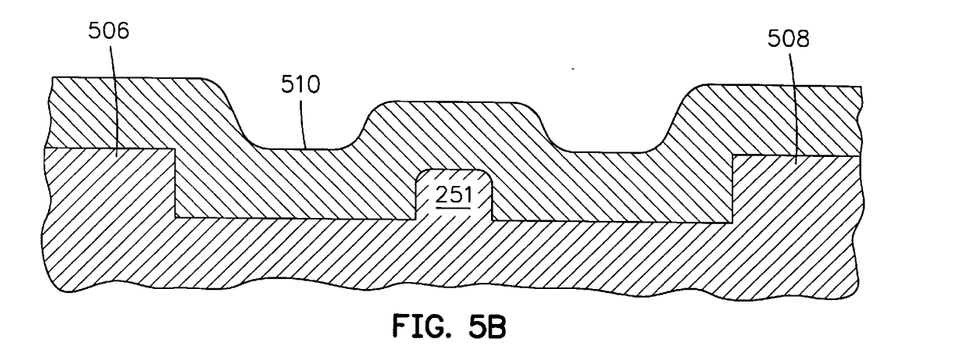

After step 404, step 406 applies an overlayer to the slider 100 coating the pole tip structure 110 and backfilling the recessed areas 206. As an example, step 406 may employ thin film deposition such as alumina sputtering, applying about one micron of the same material that composes the slider 100. After step 406, the pole tip structure 110 appears as shown in FIG. 5B. Namely, the overlayer 510 overlies the extension 251 and the outlying regions 506, 508. The overlayer 510 also fills the recessed regions 206. Although not shown in FIG. 5B, the overlayer 510 also overlies the extension 250 of the shield/pole 202, and the material between the extensions 250, 251. Although not shown, the overlayer 510 also overlies some or all of the remainder of the ABS 102.

Figure 5C:
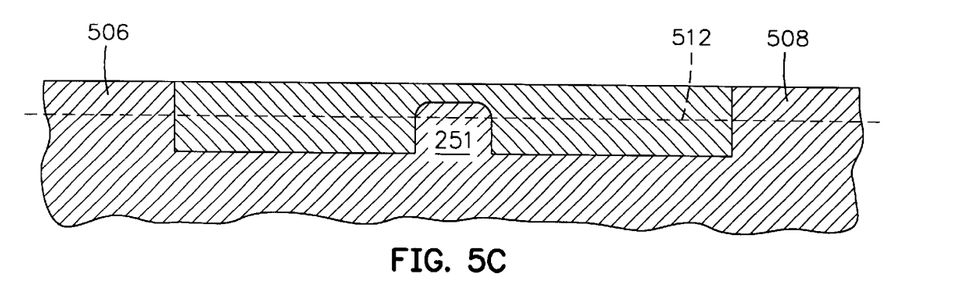

After step 406, step 408 trims the ABS 102 by lapping, grinding, slicing, chemical-mechanical polishing, mechanical polishing, chemical-mechanical planarization, or another suitable thickness-reducing technique. This trimming removes a substantially uniform thickness from the pole tip structure, in planar fashion. During the process of trimming in step 408, the overlayer material 510 overlying the pole tip structure 110 is first removed, as shown by FIG. 5C. With continued trimming, however, the overlayer as well as the pole tip structure 110 is ultimately trimmed to a depth 512. Trimming of the pole tip structure past the surfaces of the protrusion 251 and outlying regions 506/508 effectively sharpens the edges of the protrusion 251 by removing its rounded corners 505. Rounded corners of the extension 250 (not shown) are similarly sharpened. Since the trimming of step 408 effectively creates a new pole tip structure surface (at the level 512), the height difference 530 (FIG. 5A) is eliminated from the extensions 250–251 of the shield/pole 202 and pole 204, respectively.

Figure 5D:
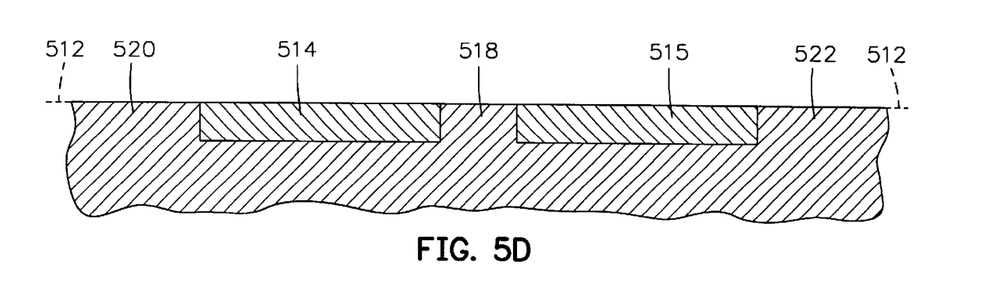

When trimming is complete, the pole tip structure 110 appears as shown in FIG. 5D. Namely, the structure exhibits a newly shaped pole extension 518 with distinct corners. Moreover, the recessed regions 206 are replaced by backfilled areas 514–515. As one example, the trimming of step 408 may remove a total of about one micron of material, leaving extensions 250–251 of about one half micron in height. Although not shown, trimming may also reduce the coating material and the underlying structure of the shield 200 and ABS 102.

Figure 6A:
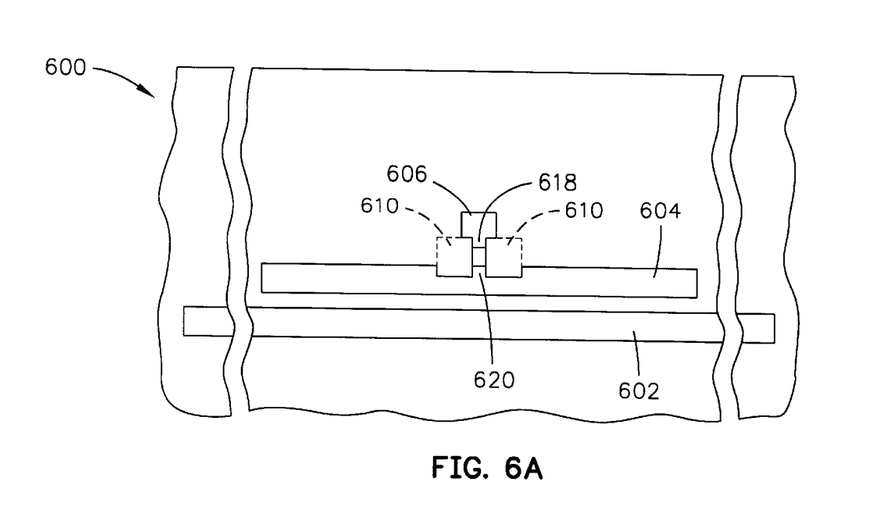
FIG. 6A is a plan view depicting a slider with a backfilled and lapped pole tip in accordance with the invention, as seen from the ABS side of the slider.

After step 408, the sequence 400 ends in step 410. With the sequence 400 complete, the finished pole tip structure appears as shown in FIGS. 6A (plan view) and FIG. 6B (perspective view). Namely, the finished pole tip structure 600 includes a shield 602, a shield/pole 604, and a pole 606, all with slightly reduced thickness. The shield/pole 604 and pole 606 include narrowed inward pointing extensions 618/620 with sharply defined corners. Moreover, the formerly recessed regions 206 are now backfilled areas 610. Thus, the region between the extensions 618/620 is substantially flat.

Hardware Structure
Read/Write Head

Figure 6B:
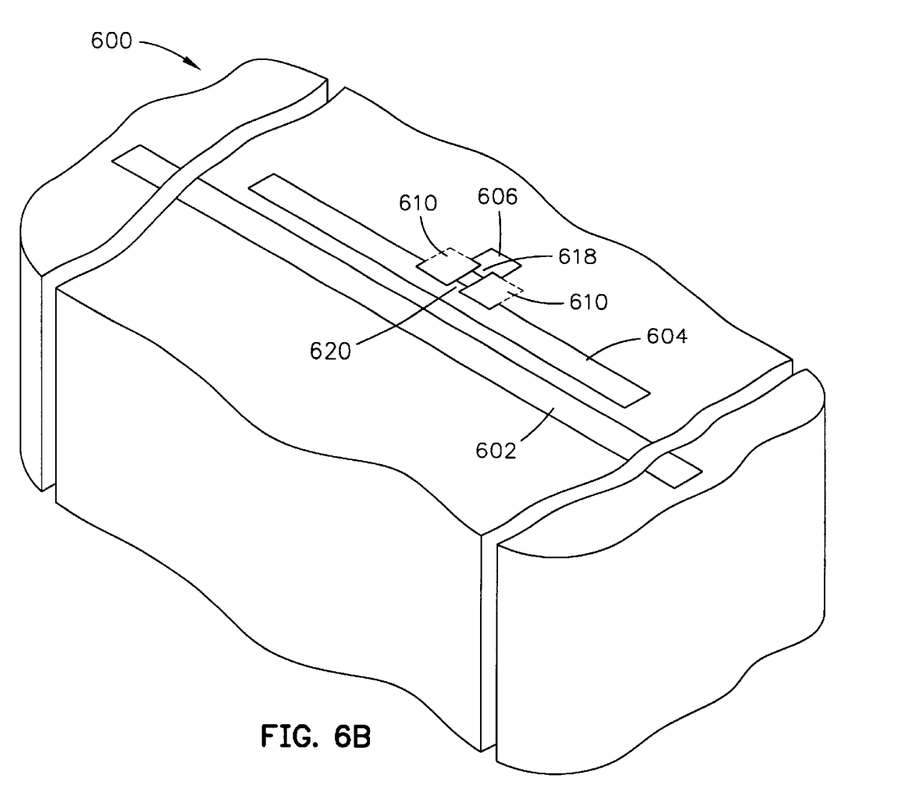
FIG. 6B is a perspective view of a slider with a backfilled and lapped pole tip structure in accordance with the invention, as seen from the ABS side of the slider.

In contrast to the manufacturing process described above, a different aspect of the invention is a pole tip trimmed read/write head with increased resistance to wear and debris collection due to certain features. This apparatus is shown in FIGS. 6A–6B, and includes the pole tip structure 600 that may be manufactured as shown above. The backfilled slider pockets 610 are resistant to debris collection, in contrast with the recessed areas present in prior pole tip trimmed sliders. The elimination of a collection site for the debris imports additional benefits to the head such as resistance to corrosive attack of the pole-tips due to entrainment of corrosive debris and resistance to head crashes caused by accumulated debris dropping onto the disk from the trimmed trench. Furthermore, the invention helps avoid any hazards posed by gallium or other corrosive materials implanted as a result of the FIBM trimming process. By encapsulating the trimmed trenches, this gallium is sequestered under an encapsulating layer, reducing the likelihood of its release in a reactive form, especially in proximity to the trimmed pole-tips themselves. Furthermore, the distinct regions extending from the pole 606 and shield/pole 604 provide a write head capable of writing signals with greater resolution. This characteristic is enhanced due to the distinct edges and the decreased pole tip recession of these extensions, as shown above.

Disk Drive System

Figure 7:
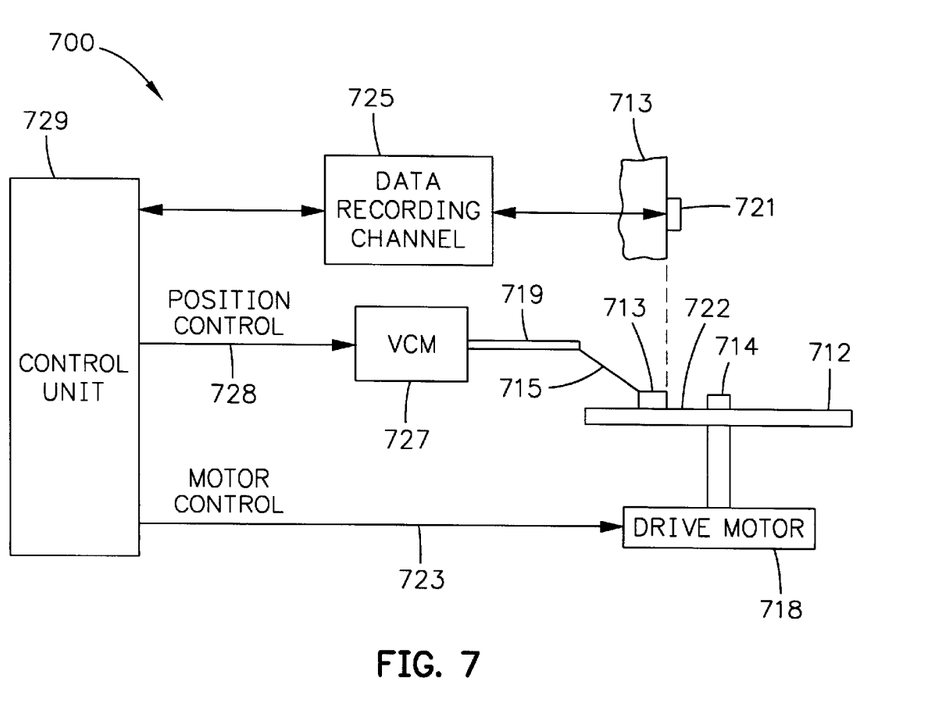
FIG. 7 is a block diagram of a disk drive system in accordance with the invention.

Another hardware aspect of the invention concerns a disk drive system, utilizing the read/write head discussed above. FIG. 7 shows a disk drive system 700 embodying the present invention. The disk drive system 700 includes at least one rotatable magnetic disk 712 supported on a spindle 714 and rotated by a disk drive motor 718. The magnetic recording media on each disk is in the form of an annual pattern of concentric data tracks (not shown) on the disk 712.

At least one slider 713 is positioned near the disk 712, each slider 713 supporting one or more magnetic read/write heads 721, where the head 721 incorporates an MR sensor for reading information. As the disks rotate, the slider 713 is moved radially in and out over the disk surface 722 so that the heads 721 may access different portions of the disk where desired data is recorded.

Each slider 713 is attached to an actuator arm 719 by means of a suspension 715. The suspension 715 provides a slight spring force that biases the slider 713 against the disk surface 722. Each actuator arm 719 is attached to an actuator mechanism 727. The actuator mechanism 719, for example, may be a voice coil motor ("VCM") comprising a coil movable within a fixed magnetic field, where the direction and speed of the coil movements are controlled by the motor current signals supplied by a controller 729.

During operation of the disk drive system 700, the rotation of the disk 712 generates an air bearing between the slider 713 and the disk surface 722, which exerts an upward force or "lift" on the slider. The surface of the slider 713 that includes the head 721 and faces the surface 722 is referred to as an air bearing surface ("ABS"). The air bearing counter-balances the slight spring force of the suspension 715 and supports the slider 713 off and slightly above the disk surface by a small, substantially constant spacing during normal operation.

In operation, the various components of the disk storage system are controlled by control signals generated by the control unit 729. These control signals include, for example, access control signals and internal clock signals. As an example, the control unit 729 may include various logic circuits, storage, and a microprocessor. The control unit 729 generates-control signals to control various system operations such as drive motor control signals on line 723 and head position and seek control signals on a line 728. The control signals on the line 728 provide the desired current profiles to optimally move and position the slider 713 to the desired data track on the disk 712. Read and write signals are communicated to and from read/write heads 721 by means of a recording channel 725.

The above description of the magnetic disk storage system and accompanying illustration of FIG. 7 are for representation purposes only. Ordinarily skilled artisans (having the benefit of this disclosure) should recognize various additions or other changes that may be made to the system 700 without departing from the invention. Moreover, disk storage systems may contain a large number of disks and actuators, and each actuator may support a number of sliders.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for finishing a read/write head that includes a pole tip structure, the pole tip structure including a shield, a shield/pole, and a pole substantially parallel to the shield/pole, where a gap region separates the pole and the shield/pole, the method comprising:

performing pole tip trimming to remove matter from the shield/pole, the pole, and the gap region to define first and second recessed areas each defining a contiguous indentation in the shield/pole, the gap region, and the pole, the recessed areas being separated by a bridge spanning between the shield/pole and the pole, the bridge including opposing extensions of the shield/pole and the pole joined by an intervening portion of the gap region;

applying an overlayer to coat the pole tip structure and fill the recessed areas;

trimming a substantially uniform thickness from the coated pole tip structure to remove the overlayer coating the shield, shield/pole, and pole; and continuing the trimming to remove a substantially uniform layer of the shield and shield/pole.

2. The method of claim 1, the trimming steps being performed by at least one of the following: chemical mechanical lapping, mechanical polishing, grinding, chemical reaction, chemical mechanical polishing, chemical mechanical planarization.

3. The method of claim 1, the application of the overlayer being performed by thin film deposition.

4. The method of claim 1, the pole tip structure residing on a substrate, the overlayer being a substantially similar material as the substrate.

5. The method of claim 1, the shield, shield/pole, and pole residing on an air bearing surface of the head, the trimming being performed by evenly removing a substantially uniform thickness of the air bearing surface.

6. A read/write head product manufactured by a process comprising:

providing a read/write head including a pole tip structure, the pole tip structure including a shield, a shield/pole, and a pole substantially parallel to the shield/pole, where a gap region of the substrate separates the pole and the shield/pole;

performing pole tip trimming to remove matter from the shield/pole, the pole, and the gap region to first and second recessed areas each defining a contiguous indentation defined in the shield/pole, the gap region, and the pole, the recessed areas being separated by a bridge spanning between the shield/pole and the pole, the bridge including opposing extensions of the shield/pole and the pole joined by an intervening portion of the gap region;

applying an overlayer to coat the pole tip structure and fill recessed areas;

trimming a substantially uniform thickness from the coated pole tip structure to remove the overlayer coating the shield, shield/pole, and pole; and continuing the trimming to remove a substantially uniform layer of the shield and shield/pole.

7. The product of claim 6, the trimming steps being performed by at least one of the following: chemical mechanical lapping, mechanical polishing, grinding, chemical reaction, chemical mechanical polishing, chemical mechanical planarization.

8. The product of claim 6, the application of the overlayer being performed by thin film deposition.

9. The product of claim 6, the pole tip structure residing on a substrate, the overlayer being a substantially similar material as the substrate.

10. The product of claim 6, the shield, shield/pole, and pole residing on an air bearing surface of the head, the trimming being performed by evenly removing a substantially uniform thickness of the air bearing surface.

11. A method for finishing a pole-tip-trimmed read/write head that includes a slider having an air bearing surface and a pole tip structure having a substantially planar surface coincident with the air bearing surface, the pole tip structure including a shield, a pole, a shield/pole interposed between the shield and pole, and an intervening region between the pole and shield/pole, where the air bearing surface has complementary pockets defined therein, each pocket occupying opposing edges of the pole and shield/pole and the intervening region therebetween so as to form opposing rectangular extensions protruding from the pole and shield/pole in substantial alignment with each other, the rectangular extensions exhibiting rounded edges at the air bearing surface, the method comprising operations of:

applying an overlayer to coat the pole tip structure and fill the pockets;

trimming a substantially uniform thickness from the coated pole tip structure to remove the overlayer coating the shield, shield/pole, and pole;

continuing the trimming sufficiently to remove a substantially uniform layer of the shield and shield/pole, to shape the extensions to provide substantially squared edges at the air bearing surface, and to leave backfill material filling the pockets and providing a surface substantially coincident with the air bearing surface.

* * * * *